United States Patent [19]
Frater et al.

[11] Patent Number: 5,353,181
[45] Date of Patent: Oct. 4, 1994

[54] ETCHED SUSPENSION SYSTEM

[75] Inventors: Norman K. Frater, San Jose; Alan P. Giorgi, Cupertino, both of Calif.

[73] Assignee: International Business Machines Corporation, Armonk, N.Y.

[21] Appl. No.: 974,043

[22] Filed: Nov. 10, 1992

[51] Int. Cl.$^5$ .................. G11B 5/48; G11B 21/16
[52] U.S. Cl. ..................... 360/104; 360/103
[58] Field of Search ............... 360/103–104

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,261,024 | 4/1981 | Desserre | 360/103 |
| 4,807,054 | 2/1989 | Sorensen et al. | 360/104 |
| 4,860,137 | 8/1989 | Shtipelman | 360/106 |
| 4,868,694 | 9/1989 | Hagen | 360/104 |
| 4,884,154 | 11/1989 | Onodera et al. | 360/104 |
| 4,996,616 | 2/1991 | Aoyagi et al. | 360/104 |
| 4,996,623 | 2/1991 | Erpelding et al. | 360/104 |
| 5,057,953 | 10/1991 | Wanlass | 360/103 X |
| 5,079,659 | 1/1992 | Hagan | 360/104 |
| 5,166,845 | 11/1992 | Thompson et al. | 360/104 X |

FOREIGN PATENT DOCUMENTS

| | | | |
|---|---|---|---|
| 90314434.3 | 8/1991 | European Pat. Off. | G11B 21/21 |
| 1909245 | 4/1977 | Fed. Rep. of Germany | G11B 5/64 |
| 01-248372 | 10/1989 | Japan | G11B 21/21 |

OTHER PUBLICATIONS

IBM Technical Disclosure Bulletin, vol. 32, No. 3A, Aug. 1989, pp. 175–176.

*Primary Examiner*—John H. Wolff
*Attorney, Agent, or Firm*—Douglas R. Millett

[57] ABSTRACT

A head suspension assembly comprises a load beam, flexure, and a transducer assembly. The transducer assembly is attached to a gimbal section of the flexure. A flexible section comprising two legs, supports the gimbal section. Two longitudinal grooves are etched into the center portions of each of the legs. A flexure is obtained which provides for adequate vertical bending, while at the same time provides rigidity to prevent horizontal bending.

49 Claims, 4 Drawing Sheets

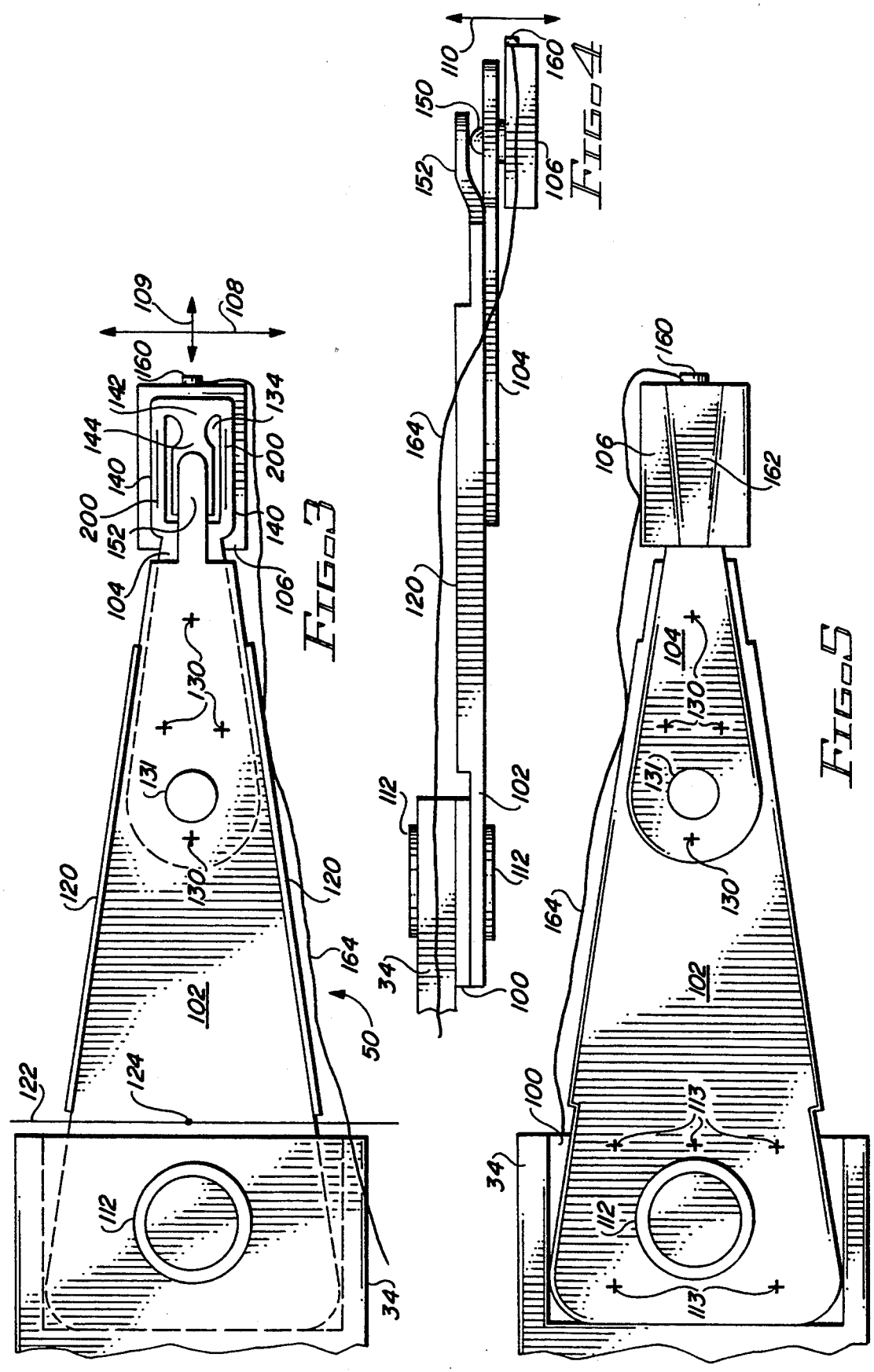

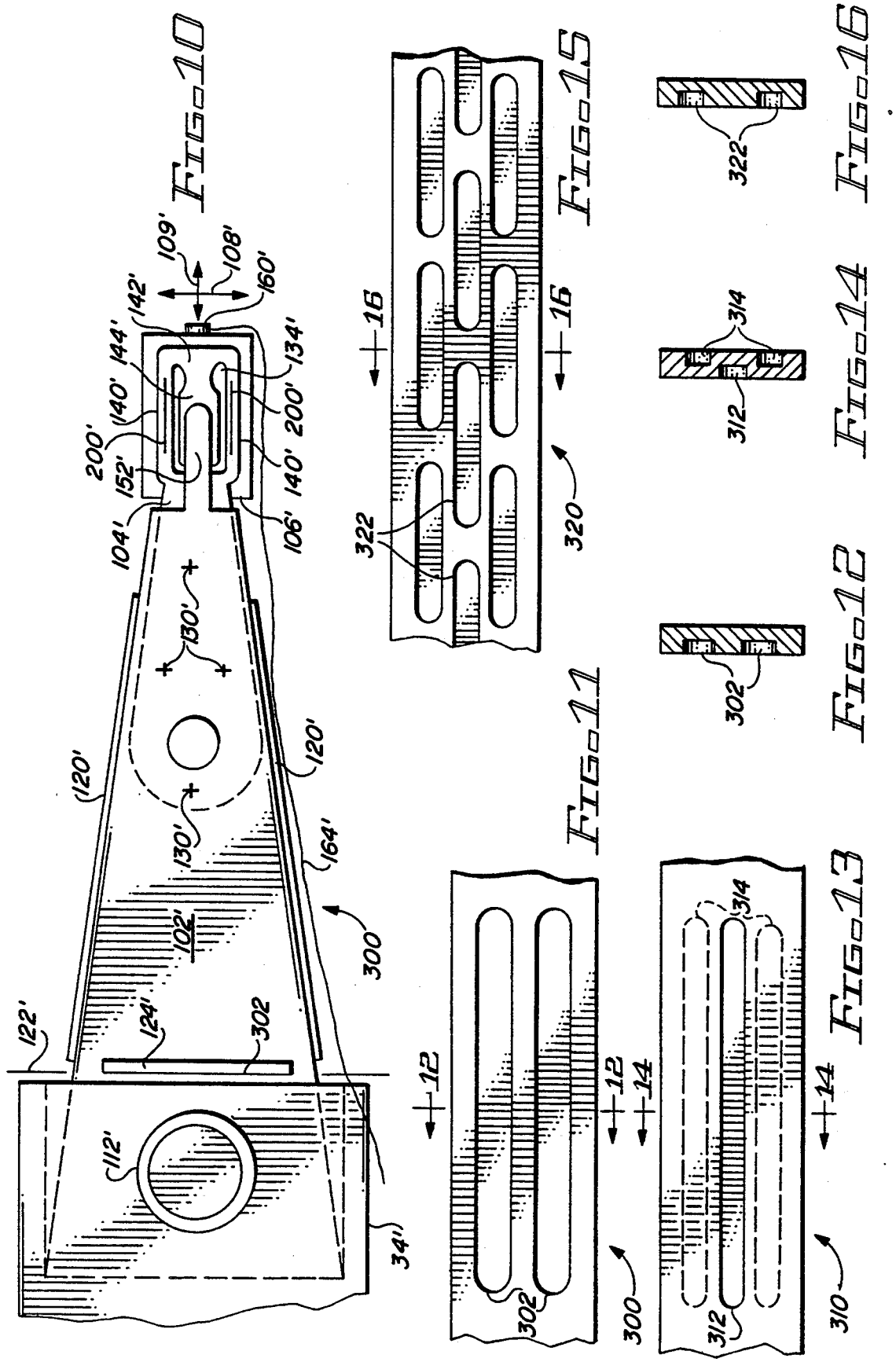

ETCHED SUSPENSION SYSTEM

BACKGROUND OF THE INVENTION

Field of the Invention

This invention relates generally to suspension systems and more particularly to a head suspension assembly for a data storage system.

Description of the Prior Art

Direct access storage devices (DASD), or disk drives, store information on concentric tracks of a rotatable magnetic recording disk. A magnetic head or transducer element is moved from track to track to read and record the desired information. Typically, the magnetic head is positioned on an air bearing slider which flies above the surface of the disk as the disk rotates. In some recently proposed disk drives, the slider (or carrier) rides on a liquid film or bearing on the disk. A head suspension assembly connects the slider to a rotary or linear actuator. The suspension provides support for the slider and allows the slider to gimbal in order to adjust its orientation as appropriate.

The head suspension assembly typically comprises a load beam attached to an actuator arm, a flexible member (known as a flexure) attached to the load beam, and a slider attached to the flexure. Examples of these suspension systems include U.S. Pat. No. 3,931,641 by Watrous; U.S. Pat. No. 4,167,765 by Watrous; U.S. Pat. No. 4,261,024 by Desserre; U.S. Pat. No. 4,807,054 by Sorensen, et al.; U.S. Pat. No. 4,860,137 by Shtipelman; U.S. Pat. No. 4,868,694 by Hagen; U.S. Pat. No. 4,884,154 by Onodera, et al.; U.S. Pat. No. 4,996,616 by Aoyagi, et al.; German patent DE 1909245; European patent application 90314434.3 by Kahn; and IBM Technical Disclosure Bulletin, Vol. 32, No. 3A, Aug. 19, 1989.

Disk drives have become smaller in size while at the same time their data storage capacity has greatly increased. The data recording density of the disks has gone up dramatically and the data tracks have become smaller and closer together. The recording heads and sliders have also decreased in size. These lighter weight heads and sliders require a more flexible suspension to support them. The large suspensions used in the older disk drives are too stiff to allow the new smaller sliders to adjust their position. While the suspensions must be flexible in the vertical direction as well as allow pitch and roll of the slider, the suspension must also be rigid in the horizontal or lateral direction in order to prevent unwanted side to side movement.

Traditionally, this problem was solved by using thinner and thinner suspension members with a proportionally larger ratio of width to thickness. However, the lower limits of thickness to which materials can be milled is being approached. Steel can be milled accurately to a thickness of 0.025 mm. For sake of comparison, a piece of paper is 0.1 mm thick. Below 0.025 mm in thickness, the irregularities in the grain structure of the steel cause great variations in the thickness and make the material unsuitable for use in suspensions.

What is needed is a suspension system which can provide the desired flexibility in the vertical direction for the smaller heads and sliders, while at the same time maintaining adequate rigidity to prevent bending in the horizontal direction.

SUMMARY OF THE INVENTION

In accordance with the present invention, a flexure is made from an extremely thin sheet of material. The flexure is attached to a load beam. The load beam has an etched groove at a spring section. The load beam groove allows the load beam to bend in an up or down direction at the spring section. The flexure has a flexible section which supports a gimbal section. A slider is attached to the gimbal section. The flexible section is comprised of two leg members which have centrally etched grooves. The etched grooves allow the flexible section to bend in a vertical direction and allow the gimbal section to pitch and roll as appropriate. At the same time, the flexible section resists bending in a horizontal direction.

For a fuller understanding of the nature and advantages of the present invention, reference should be made to the following detailed description taken in conjunction with the accompanying drawings.

BRIEF DESCRIPTION OF THE DRAWINGS

FIG. 3 is a top view of a suspension system of the present invention;

FIG. 4 is a side view of the system of FIG. 3;

FIG. 5 is a bottom view of the system of FIG. 3;

FIG. 10 is a top view of an alternative embodiment of the suspension system of the present invention;

FIG. 11 is a top view of an alternative embodiment of the flexure of the present invention;

FIG. 12 is a cross-sectional view of the flexure of FIG. 11;

FIG. 13 is a top view of an alternative embodiment of the flexure of the present invention;

FIG. 14 is a cross-sectional view of the flexure of FIG. 13;

FIG. 15 is a top view of an alternative embodiment of the flexure of the present invention; and FIG. 16 is a cross-sectional view of the flexure of FIG. 15.

DESCRIPTION OF THE PREFERRED EMBODIMENTS

Figure 1:
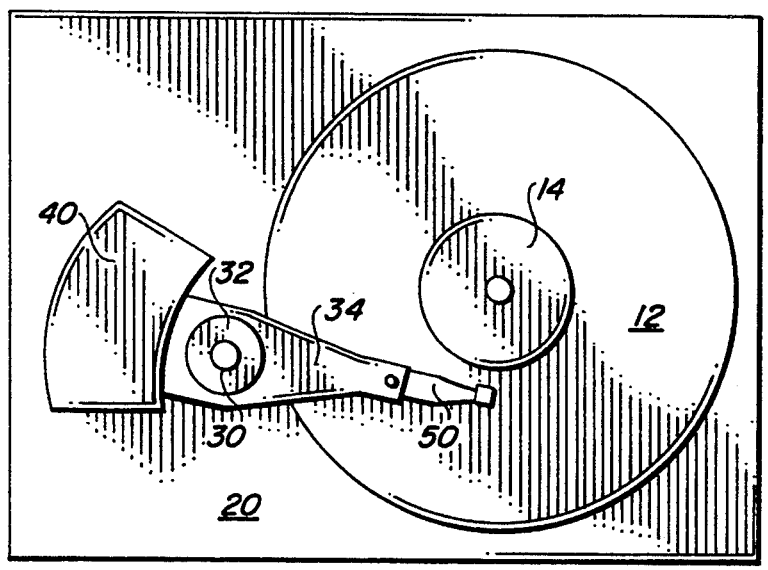
FIG. 1 is a top view of a disk drive system of the present invention.
Figure 2:
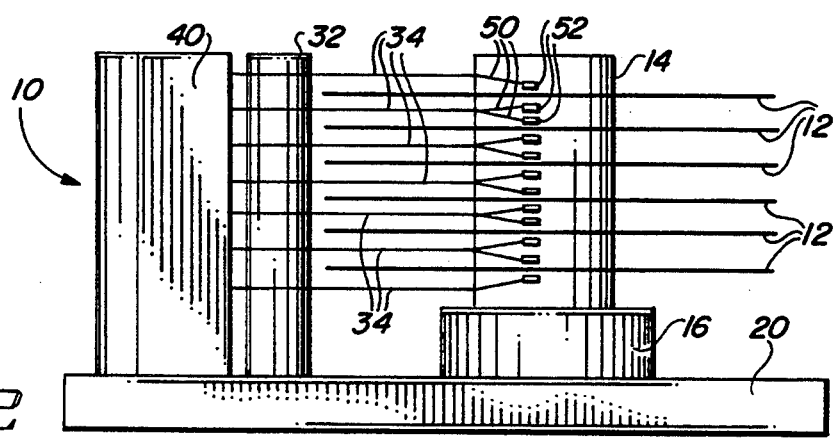
FIG. 2 is a side view of the system of FIG. 1.

FIGS. 1 and 2 show a top and a side view, respectively, of a disk drive system of the present invention and is designated by the general reference number 10. System 10 comprises a plurality of magnetic recording disks 12 mounted to a spindle 14. The disks 12 may be particulate or thin film recording disks as are known in the art or they may be the liquid bearing type which have recently been proposed. Spindle 14 is attached to a spindle motor 16 which rotates the spindle 14 and disks 12. Motor 16 is attached to a chassis 20. A shaft 30 is attached to chassis 20. A hub assembly 32 rotates about shaft 30 and supports a plurality of actuator arms 34. The stacked arms 34 are sometimes referred to as a comb. A rotary voice coil motor 40 is attached to chassis 20 and to a rear portion of the arms 34.

A plurality of head suspension assemblies 50 are attached to arms 34. A plurality of transducer heads 52 are attached to the suspension assemblies 50. The heads 52 are located proximate the disks 12 such that they are in electromagnetic communication with the disks 12 and can read or write data to or from them. Motor 40 rotates arms 34 about shaft 30 in order to move the head suspension assemblies 50 to the desired radial position on disks 12. The shaft 30, hub 32, arms 34 and motor 40 are referred to as a rotary actuator assembly.

FIGS. 3, 4 and 5 show a top, side and bottom view, respectively, of head assembly 50. Assembly 50 comprises a support plate 100, a load beam 102, a flexure 104, and a slider 106. Slider 106 is a fluid bearing slider and may be either an air bearing slider or a liquid bearing slider, depending upon which type of disk is used. Support plate 100 is positioned between arm 34 and load beam 102 in order to provide a good support surface for the connection of the load beam 102 to the arm 34. Support plate 100 is preferably made of a rigid material such as stainless steel. The arm 34 and support plate 100 are attached together by a swage or rivet connector 112 or equivalent attachment. Support plate 100 and load beam 102 are attached together by a plurality of welds 113.

An arrow 108 represents a lateral direction axis, an arrow 109 represents a longitudinal direction axis, and an arrow 110 represents a vertical direction axis.

Load beam 102 is made of a thin piece of material. In a preferred embodiment, the material may be stainless steel, in a range of thicknesses of 0.03 to 0.08 mm. It is desired that load beam 102 be rigid along its length in order to resist bending in the vertical and horizontal directions. To increase the vertical stiffness a pair of flange members 120 are bent up along the edges of beam 102. An axis 122 passes through load beam 102 in a lateral direction proximate support plate 100. Although it is desired that load beam 102 be rigid along its length, it is necessary that the beam 102 provide some vertical spring force to compensate for the air bearing force generated by slider 106 during operation. In order to allow the beam 102 to bend slightly about axis 122, the flanges 120 are not extended to the location proximate the axis 122. This section of beam 102 proximate axis 122 is known as the spring section 124. The beam 102 is allowed to move slightly up or down by bending rotationally along axis 122 at the spring section 124.

Flexure 104 is attached to load beam 102 by a plurality of welds 130. An aperture 131 passes through both load beam 102 and flexure 104. During the welding process, a pin is temporarily inserted into aperture 131 to insure proper alignment of the load beam 102 and flexure 104. The pin is removed after the welds are performed. Flexure 104 is preferably made of a thin metal sheet such as stainless steel. The thickness of the sheet should be as small as possible. In the preferred embodiment, the lower limit of the thickness is determined by the constraints of the manufacturing process. For stainless steel material the lower bound of thickness is in the range 0.02 mm to 0.03 mm and is 0.025 mm in the preferred embodiment.

Flexure 104 has an aperture 134 which is surrounded by a pair of longitudinal leg or side sections 140, and an end section 142. A tab or tongue section 144 extends from end section 142 into aperture 134. The leg sections 140 are referred to as the flexible section and the tab 144 is referred to as a tongue or gimbal section. Tab 144 has a dimple 150 which is press formed onto its top surface. Dimple 150 is engaged on its top surface by a load support member 152 which extends from load beam 102.

Slider 106 is attached to the bottom surface of tab section 144 by a suitable cement. A magnetic transducer element 160 is attached to slider 106. Slider 106 has an aerodynamic surface 162 which allows the slider to create a fluid bearing between itself and the rotating disk. An electrical wire harness 164 is connected to element 160 and may be tacked to load beam 102 with a suitable cement.

The slider 106 and tab 144 gimbal by pivoting about the point of contact between dimple 150 and load support member 152. This allows the slider 106 to pitch (rotate about the lateral axis 108), and roll (rotate about the longitudinal axis 109). To achieve this movement, the leg sections 140 must be able to bend in a vertical direction.

Figure 6:
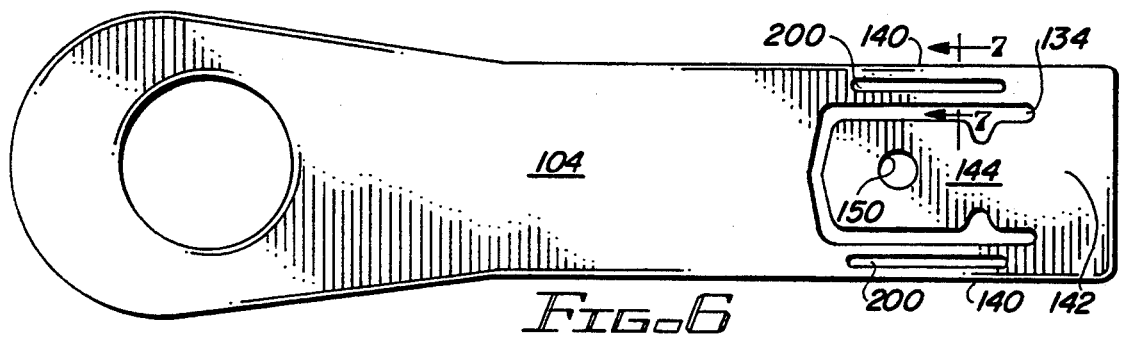
FIG. 6 is a top view of the flexure of the present invention.

FIG. 6 is a top view of the flexure 104. Leg sections 140 each have a groove or recess 200 which runs along the center portion of leg sections 140 in a longitudinal direction. These grooves 200 are preferably photolithographically etched into the flexure 104. The sheet of metal from which the flexure is to be made is coated with photoresist. The photoresist is exposed from both sides with a pattern of the desired shape of flexure 104. However, only one side is exposed with the pattern of the groove sections 200. The photoresist is developed and the exposed sections are removed. The sheet is then placed in an acid bath for a period of time sufficient for the acid to etch away one half of the thickness of the sheet from each side. The result is that the flexure is completely detached from the sheet and the grooves on one side of the flexure are etched to a depth of approximately one half of the thickness of the material. Alternatively, the grooves 200 may be made separately to any desired depth. In the preferred embodiment, the grooves are in the range of 40-80% of the thickness of the flexure 104 and ideally are 60%.

Figure 7:
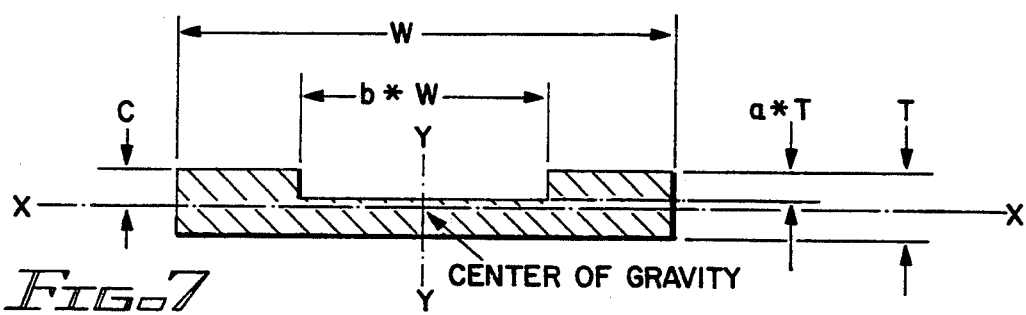
FIG. 7 is a cross-sectional view of a portion of the flexure of FIG. 6.

FIG. 7 shows a cross-sectional view of one of the leg sections 140. The width of a leg section 140 is designated by W, the width of the groove 200 is designated by b*W (where $0<b<1$), the thickness of leg sections 140 is designated by T, and the depth of the groove 200 from the top surface of leg section 140 is designated by a*T (where $0<a<1$). The location of the neutral axis XX (center of gravity) in the vertical direction is designated by C. The ability of the leg sections 140 to bend in the vertical direction by rotating about neutral axis XX is determined by the moment of inertia about the XX axis (IXX). The smaller the moment of inertia the more flexible or easier to bend the member will be. For leg section 140:

$$IXX = W*T*[C^2(1-a*b) - C*T*(1-a^2*b) + T^{2}*(1-a^3*b)/3]$$

where $$C = \frac{T*(1 - a^2*b)}{2*(1 - a*b)}$$

The ability of leg sections 140 to bend about axis YY is determined by the moment of inertia about the YY axis (IYY). For leg section 140:

$$IYY = T*W^3*(1-a.b^3)/12$$

As described above, the leg sections 140 must be flexible enough to allow bending in the vertical direction (rotation about the XX axis) in order to allow the slider 106 to gimbal (pitch and roll). At the same time, the leg sections 140 must be rigid enough to resist bending in the horizontal direction (rotation about the YY axis). The etched grooves 200 achieve this by decreasing the IXX while maintaining the IYY almost unchanged from the moment of inertia of a leg section which does not have a groove.

Figure 8:
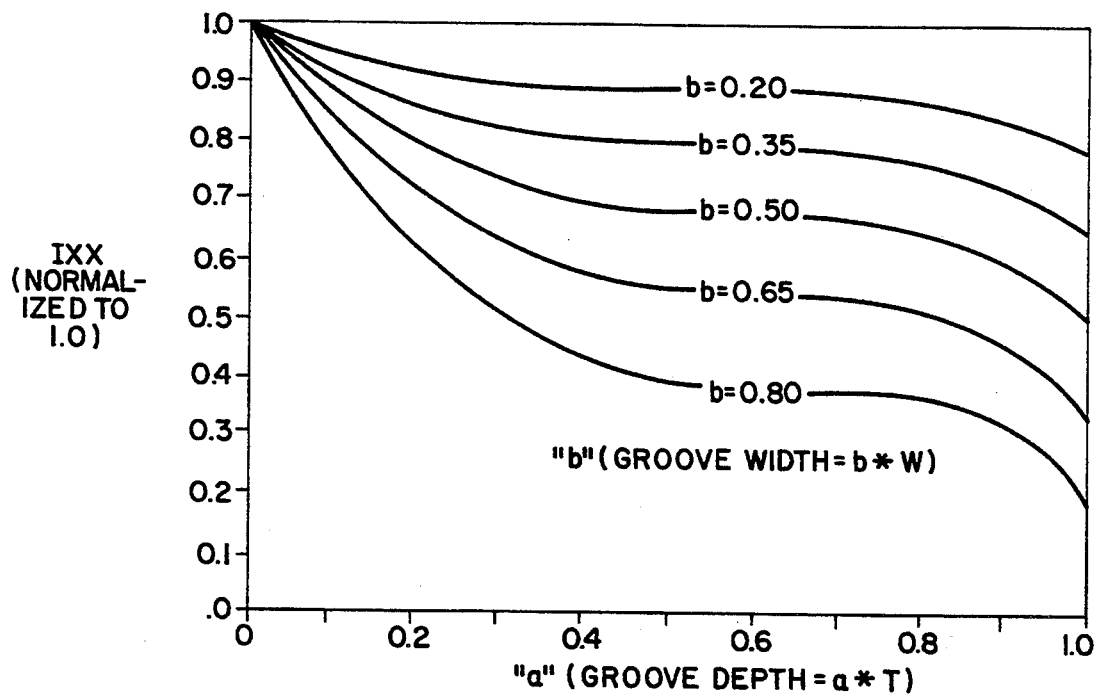
FIG. 8 is a graph of moment of inertia IXX versus groove depth for the flexure of the present invention.

FIG. 8 shows a graph of IXX versus groove depth for a leg section 140. The groove depth is shown as a fraction "a" of the leg thickness T. Five different groove widths are shown as a fraction "b" of the leg width W. Note that a zero fraction groove depth corresponds to a leg section 140 which has no groove 200. In the preferred embodiment, the groove width b*W should be in the range of 20-80 percent (ideally 50%) of the width W of the leg section 140 and the groove depth a*T should be in the range of 40-85% (ideally 60%) of the thickness T of the leg section 140. This gives an IXX in the desired range of 40-90 percent (ideally 70%) of the IXX of an ungrooved section. The inventors have discovered an additional benefit of the present invention. Note that in the range of 40-85 percent groove depth each curve is essentially flat and the IXX does not vary significantly. This means that during manufacture of the flexure, the tolerance limits for the etch depth can be very large. For example, the ideal case may be to etch the groove to a 60 percent depth. However, a groove etched anywhere in the range of 40-85 percent depth will give approximately the same performance and will be acceptable. This makes the manufacturing process easier and more economical.

Figure 9:
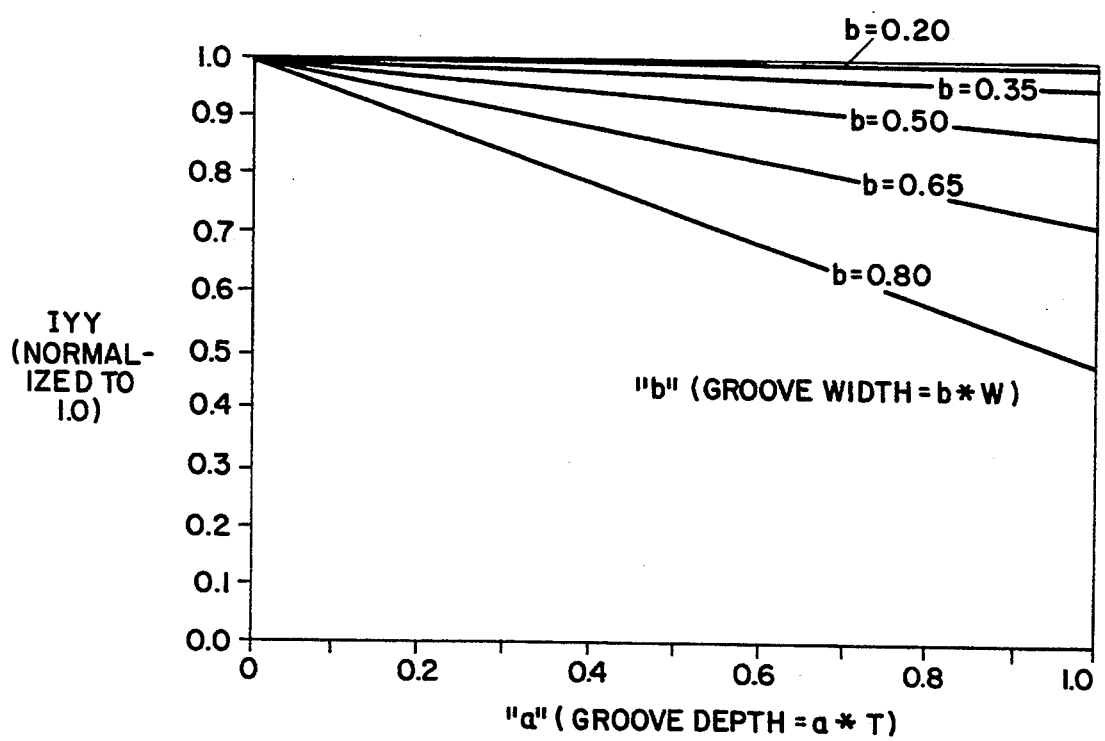
FIG. 9 is a graph of moment of inertia IYY versus groove depth for the flexure of the present invention.

FIG. 9 shows a graph of IYY versus groove depth for leg section 140. In the preferred embodiment described above, the groove width b*W is in the range of 20-80% (ideally 50%) of the width W of the leg section 140, and the groove depth a*T is in the range of 40-85% (ideally 60%) of the thickness T of leg section 140. This gives an IYY in the desired range of 60-99% (ideally 93%) of the IYY of the ungrooved section.

FIG. 10 shows an alternative embodiment of the head suspension assembly of the present invention and is designated by the general reference number 300. Elements of system 300 which are similar to elements of system 50 are designated by a prime number. The only difference in system 300 is that it now contains a groove 302 in the spring section 124' of load beam 102'. The groove 302 extends along the axis 122'. This groove 302 is photolithographically etched into beam 102' in a process similar to that described in connection with grooves 200. Groove 302 decreases the moment of inertia about axis 122' and allows beam 102' to have more flexibility in the spring section 124'. The desired amount of flexibility is determined by the moment of inertia formulas given above and depends upon the groove depth and length (distance across the width of beam 102'). In a preferred embodiment, the groove depth is in the range of 40-85%, (ideally 60%) of the total thickness and the groove width is in the range of 20-80%, (ideally 50%) of the total width.

FIGS. 11 and 12 show an alternative embodiment of the leg section of the present invention and is designated by the general reference number 300. Leg section 300 has a pair of grooves 302 on a single side of the leg section.

FIGS. 13 and 14 show an alternative embodiment of the leg section of the present invention as designated by the general reference number 310. Leg section 310 has a single groove 312 extending from one surface and a pair of grooves 314 formed in the other surface.

FIGS. 15 and 16 show an alternative embodiment of the leg section of the present invention and is designated by the general reference number 320. Leg section 320 has a plurality of grooves 322 which are arranged in three lines in a staggered pattern. All of the grooves shown in leg sections 300, 310 and 320 may be formed similar to grooves 200 as described above.

The present invention may be used in many other embodiments. The etched sections may be created in any type of desired pattern to form different types of shapes. For example, the recesses can have different shapes other than grooves. The etched recesses may also be arranged asymmetrically with respect to the flexure.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A suspension system comprising:
    a support member;
    a load member; and
    a suspension member connecting the load member to the support member, the suspension member having a first surface having a recess therein at a point where bending is desirable, the recess passing only partially through the suspension member, the recess having a bottom side thickness less than the thickness of the surrounding suspension member, and the recess intersecting only the first surface.

2. The system of claim 1, wherein the load member is a transducer element.

3. The system of claim 1, wherein the suspension member is a flexure.

4. The system of claim 1, wherein the suspension member is a load beam of a head suspension assembly.

5. The system of claim 1, wherein the depth and width of the recess is such that the moment of inertia about a lateral axis of the suspension member is in the range of 40-90% of the moment of inertia about the lateral axis of a similar suspension member which does not have a recess.

6. The system of claim 1, wherein the depth of the recess is in the range of 40-85% of the thickness of the surrounding suspension material.

7. The system of claim 1, wherein the width of the recess is in the range of 20-80% of the width of the surrounding suspension member.

8. The system of claim 1, wherein the recess is formed by an etch process.

9. The system of claim 1, wherein the suspension member at the recess has a cross section of an integral material.

10. The system of claim 9, wherein the integral material is stainless steel.

11. The system of claim 1, wherein the load member is a transducer element, and the system further comprises a data recording medium located proximate to the transducer element, and a movement means for moving the transducer element relative to the medium.

12. A suspension system comprising:
a load beam;
a flexure connected to the load beam, the flexure having an aperture surrounded by two side sections and an end section, a tab section extending from the end section into the aperture, the tab section for connection to a transducer element, the two side sections each having a recess formed in a first surface thereof, each recess passing only partially through the side section, each recess having a bottom side thickness less than the thickness of the surrounding side section, and each recess intersecting only the first surface.

13. The system of claim 12, wherein the depth and width of the recesses are such that the moment of inertia about a lateral axis of each side section is in the range of 40-90% of the moment of inertia about the lateral axis of a similar side section which does not have a recess.

14. The system of claim 12, wherein the depth of each recess is in the range of 40-85% of the thickness of the surrounding side section.

15. The system of claim 12, wherein the width of each recess is in the range of 20-80% of the width of the surrounding side section.

16. The system of claim 12, wherein the recesses are formed by a photolithographic etch process.

17. The system of claim 12, wherein each side section has a cross section, at the recess, of an integral material.

18. The system of claim 17, wherein the integral material is stainless steel.

19. The system of claim 12, further comprising an air bearing slider connected between the flexure and the transducer element.

20. The system of claim 12, wherein the recess is a groove.

21. The system of claim 12, further comprising a transducer element connected to the tab section.

22. A data storage system comprising:
a load beam;
a flexure connected to the load beam, the flexure having an aperture surrounded by two side sections and an end section, a tab section extending from the end section into the aperture, the two side sections each having a recess formed in a first surface thereof, each recess passing only partially through the side section, each recess having a bottom side thickness less than the thickness of the surrounding side section, and each recess intersecting only the first surface;
a transducer element connected to the tab section;
a data recording disk located proximate to the transducer element;
a rotation means connected to the disk for rotating the disk; and
a movement means connected to the load beam for moving the transducer element relative to the disk.

23. The system of claim 22, wherein the depth and width of the recesses are such that the moment of inertia about a lateral axis of each side section is in the range of 40-90% of the moment of inertia about the lateral axis of a similar side section which does not have a recess.

24. The system of claim 22, wherein the depth of each recess is in the range of 40-85% of the thickness of the surrounding side section.

25. The system of claim 22, wherein the width of each recess is in the range of 20-80% of the width of the surrounding side section.

26. The system of claim 22, wherein the recesses are formed by a photolithographic etch process.

27. The system of claim 22, wherein each side section has a cross section, at the recess, of an integral material.

28. The system of claim 27, wherein the integral material is stainless steel.

29. The system of claim 22, further comprising an air bearing slider connected between the flexure and the transducer element.

30. The system of claim 22, wherein the recess is a groove.

31. A suspension system comprising:
a load beam having a longitudinal axis and having a spring section for bending, the spring section having a recess formed in a first surface thereof, the recess oriented along a lateral axis substantially perpendicular to the longitudinal axis, the recess passing only partially through the load beam, the recess having a bottom side thickness less than the thickness of the surrounding load beam, and the recess intersecting only the first surface; and
a flexure connected to the load beam for connection to a transducer element.

32. The system of claim 31, wherein the depth and width of the recess is such that the moment of inertia about the lateral axis of the load beam is in the range of 40-90% of the moment of inertia about the lateral axis of a similar load beam which does not have a recess.

33. The system of claim 31, wherein the depth of the recess is in the range of 40-85% of the thickness of the surrounding load beam.

34. The system of claim 31, wherein the width of the recess is in the range of 20-80% of the width of the surrounding load beam.

35. The system of claim 31, wherein the recess is formed by a photolithographic etch process.

36. The system of claim 31, wherein the load beam has a cross section, at the recess, of an integral material.

37. The system of claim 36, wherein the integral material is stainless steel.

38. The system of claim 31, further comprising an air bearing slider connected between the flexure and the transducer element.

39. The system of claim 31, wherein the recess is a groove.

40. The system of claim 31, further comprising a transducer element connected to the flexure.

41. A data storage system comprising:
a load beam having a longitudinal axis and having a spring section for bending, the spring section having a recess formed in a first surface thereof, the recess oriented along a lateral axis substantially perpendicular to the longitudinal axis, the recess passing only partially through the load beam, the recess having a bottom side thickness less than the thickness of the surrounding side section, and the recess intersecting only the first surface;
a flexure connected to the load beam;
a transducer element connected to the flexure;
a data recording disk located proximate to the transducer element;
a rotation means connected to the disk for rotating the disk; and
a movement means connected to the load beam for moving the transducer element relative to the disk.

42. The system of claim 41, wherein the depth and width of the recess is such that the moment of inertia about a lateral axis of the load beam is in the range of 40-90% of the moment of inertia about the lateral axis of a similar load beam which does not have a recess.

43. The system of claim 41, wherein the depth of the recess is in the range of 40-85% of the thickness of the surrounding load beam.

44. The system of claim 41, wherein the width of the recess is in the range of 20-80% of the width of the surrounding load beam.

45. The system of claim 41, wherein the recess is formed by a photolithographic etch process.

46. The system of claim 41, wherein the load beam has a cross section, at the recess, of an integral material.

47. The system of claim 46, wherein the integral material is stainless steel.

48. The system of claim 41, further comprising an air bearing slider connected between the flexure and the transducer element.

49. The system of claim 41, wherein the recess is a groove.

* * * * *